United States Patent [19]
Van Slyke

[11] Patent Number: 6,108,129
[45] Date of Patent: Aug. 22, 2000

[54] MICRO FOCUSER

[76] Inventor: Paul B. Van Slyke, 12815 Porcupine La., Colorado Springs, Colo. 80908-3503

[21] Appl. No.: 09/130,556

[22] Filed: Aug. 10, 1998

[51] Int. Cl.⁷ .............................. G02B 23/06; G02B 7/02; F16H 27/02
[52] U.S. Cl. .......................... 359/426; 359/826; 74/89.15
[58] Field of Search ...................................... 359/426, 425, 359/427, 826, 825, 823; 29/434; 74/89.15

[56] References Cited

U.S. PATENT DOCUMENTS

| | | | |
|---|---|---|---|
| 2,245,405 | 6/1941 | Langsner | 359/426 |
| 2,489,579 | 11/1949 | Hillman | 359/426 |
| 2,564,704 | 8/1951 | Martling | 359/426 |
| 5,123,723 | 6/1992 | Chesnutt et al. | 359/823 |

*Primary Examiner*—Jon Henry
*Attorney, Agent, or Firm*—G. F. Gallinger

[57] ABSTRACT

A secondary focuser which facilitates minute and measured incremental changes of the focal length within a limited travel distance is disclosed. The secondary focuser is used to micro focus telescopes for astro photography. A method of constructing the micro focuser comprises the following steps: constructing a housing having an open central axis therethrough; slidably disposing a travelling inner sleeve within the housing; and, mounting and arranging a micrometer head on the housing. When the micrometer head is turned the inner sleeve travels within the housing finely adjusting an axial length therethrough. In a preferred aspect of the invention the micrometer head is configured to turn about an axis generally perpendicular to the central axis through the housing, pivoting a rocker arm so that when one end portion of the rocker arm is moved in a radial direction, the other end moves in a direction generally parallel to the central axis, thereby longitudinally shifting the travelling sleeve.

12 Claims, 1 Drawing Sheet

MICRO FOCUSER

FIELD OF INVENTION

This invention relates to an apparatus for accurately focusing an image received with a telescope. More particularly this invention relates to a secondary focuser which facilitates minute and measured incremental changes of the focal length within a limited travel distance.

BACKGROUND OF THE INVENTION

The three popular focusing mechanisms available on the astronomy market—rack and opinion, helical, and Crayford focusers, are specifically designed for rough, course focusing movements used in eyepiece viewing of the celestial heavens. Astro photography, also known as astro imaging, requires a focusing mechanism which is capable of a finer, more measured incremental change of focal length. The availability of digital cameras and computers has stimulated interest in astro imaging and augmented the demand for a focuser which is capable of accurate and fine incremental movements without any lateral shift.

OBJECTS AND STATEMENT OF INVENTION

It is an object of this invention to disclose an apparatus for finely and accurately focusing an image received for astro photography. It is yet a further object of this invention to disclose an apparatus which is capable of finely measured incremental travel. It is a final object of this invention to disclose a focuser having a mechanism which eliminates lateral shift of an image.

One aspect of this invention provides for a method of constructing a micro focuser for finely and incrementally changing focal length to secondarily focus a telescope comprising the following steps: constructing a housing having an open central axis therethrough; slidably disposing a travelling inner sleeve within the housing; and, mounting and arranging a micrometer head on the housing; so that when the micrometer head is turned the inner sleeve travels within the housing finely adjusting an axial length therethrough.

Another aspect of this invention includes a micrometer head which turns about an axis generally perpendicular to the central axis through the housing, and a rocker arm pivoted so that when a central shaft in the micrometer head moves one end portion of the rocker arm in a radial direction, then the other end thereof moves in a direction generally parallel to the central axis, thereby longitudinally shifting the travelling sleeve.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
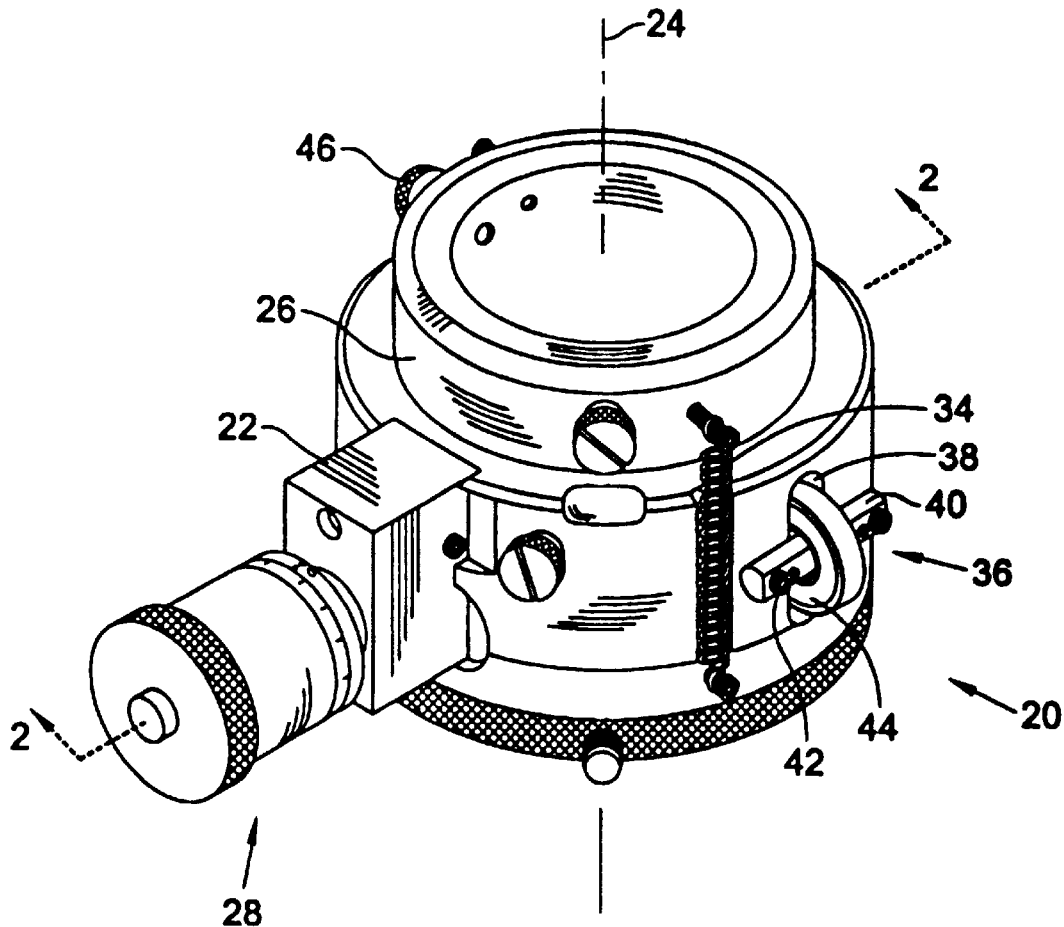
FIG. 1 is a perspective view of a micro focuser.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a micro focuser 20. The micro focuser 20 is a secondary focuser used to finely and incrementally change the focal length measured axially through the focuser. A method of constructing a micro focuser 20 comprises: constructing a housing having 22 an open central axis 24 therethrough; slidably disposing a travelling sleeve 26 within the housing 22; and mounting and arranging a micrometer head 28 on the housing 22. Most preferably the housing 22 and sleeve 26 are generally cylindrical. In the preferred embodiment an outer portion of the micrometer head 28 turns about an axis generally perpendicular to the central axis 24 through the housing 22. This perpendicular position of the micrometer head 28 is most convenient for use.

Figure 2:
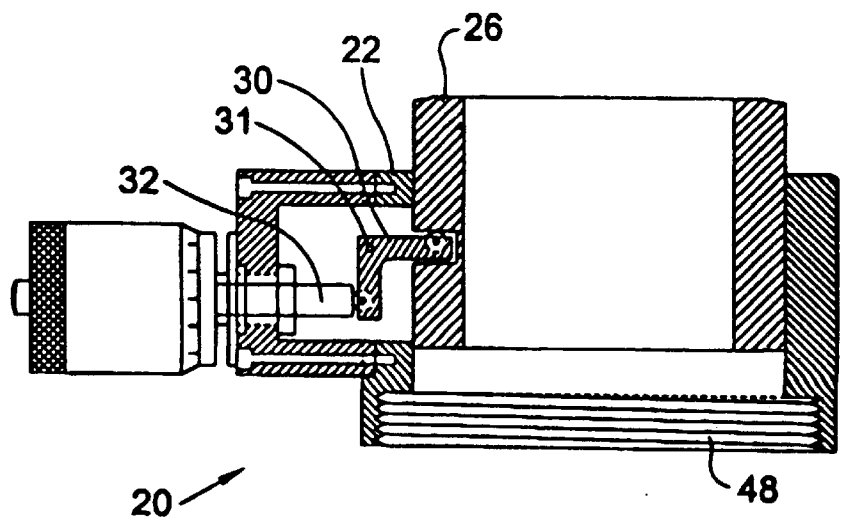
FIG. 2 is a cross sectional view of the micro focuser shown in FIG. 1 taken along line 2—2 therein.

FIG. 2 is a cross sectional view of the micro focuser 20 taken along line 2—2 in FIG. 1. Referring to FIG. 2, rocker arm 30 having an L shaped cross section is shown pivoted through a central portion thereof. The rocker arm 30 is pivoted 31 so that when a central shaft 32 in the micrometer head 28 moves one end portion of the rocker arm 30 in a radial direction, then the other end thereof moves in a direction generally parallel to the central axis 24, longitudinally shifting the travelling sleeve 26.

Referring back to FIG. 1, it may be observed that the travelling sleeve 26 has one end portion extending from the housing 28. This extending end portion is biased by a spring 34 towards the housing 22. Such biasing eliminates play in the focal length.

A bearing mechanism 36 is adapted to facilitate movement between the housing 22 and the travelling sleeve 26. This bearing mechanism stabilizes the inner sleeve 26 providing a zero lateral image shift when focusing. The bearing mechanism 36 is positioned on a side portion of the housing 20 which has a longitudinal slot 38 therethrough opposite to the micrometer head 28. The bearing mechanism 36 most preferably comprises a spindle 40 extending laterally across the lateral slot 38. An adjusting screw 42 holds each end portion of the spindle 40 to the housing 22. A bearing assembly 44 has an inner diameter which encircles the spindle 40, and an outer diameter which extends through the slot 38 to the travelling sleeve 26. The adjusting screws 42 may be tightened thereby pressing the outer diameter of the bearing assembly 44 against the travelling sleeve 26.

The extending end portion of the travelling sleeve 26 and an opposite end portion of the housing 22 are adapted for coupling. The coupling comprises a radial locking screw 46 for coupling to another tube structure (not shown) above traveling sleeve 26, as shown in FIGS. 1 and 2. The coupling may or may not include an internal thread 48 extending around an end portion of the housing 22.

In use when the micrometer head 28 is turned the inner sleeve 26 travels within the housing 22 finely and incrementally adjusting an axial length therethrough.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A method of constructing a micro focuser for finely and incrementally changing focal length to secondarily focus a telescope comprising the following steps:

constructing a housing having an open central axis therethrough;

slidably disposing a travelling inner sleeve within the housing; and, mounting and arranging a micrometer head on the housing;

so that when the micrometer head is turned about an axis generally lateral to the central axis through the housing the inner sleeve travels within the housing finely adjusting an axial length therethrough.

2. A method as in claim 1 wherein the housing and sleeve are generally cylindrical.

3. A method as in claim 1 wherein an outer portion of the micrometer head turns about an axis generally perpendicular to the central axis through the housing.

4. A method as in claim 3 further comprising a rocker arm pivoted so that when a central shaft in the micrometer head moves one end portion of the rocker arm in a radial direction, then the other end thereof moves in a direction generally parallel to the central axis, longitudinally shifting the travelling sleeve.

5. A method as in claim 4 wherein the rocker arm has an L shaped cross section and is pivoted through a central portion thereof.

6. A method as in claim 5 wherein the travelling sleeve has one end portion extending from the housing and said extending end portion is biased towards the housing.

7. A method as in claim 4 further comprising a bearing mechanism adapted to facilitate movement between the housing and the travelling sleeve.

8. A method as in claim 7 wherein the bearing mechanism is positioned on a side portion of the housing opposite to the micrometer head.

9. A method as in claim 8 further comprising a longitudinal slot in the housing and wherein the bearing mechanism comprises a spindle extending laterally across the lateral slot and an adjusting screw holding each end portion of the spindle to the housing, a bearing assembly having an inner diameter encircling the spindle, and an outer diameter extending through the slot to the travelling sleeve, so that the adjusting screws may be tightened so that the inner sleeve may be held snugly within the housing.

10. A method as in claim 5 where wherein the extending end portion of the travelling sleeve and an opposite end portion of the housing are adapted for coupling.

11. A method as in claim 10 wherein the coupling comprises a radial locking screw.

12. A method as in claim 11 further comprising an internal thread extending around an end portion of the housing.

* * * * *